United States Patent Office 2,810,633
Patented Oct. 22, 1957

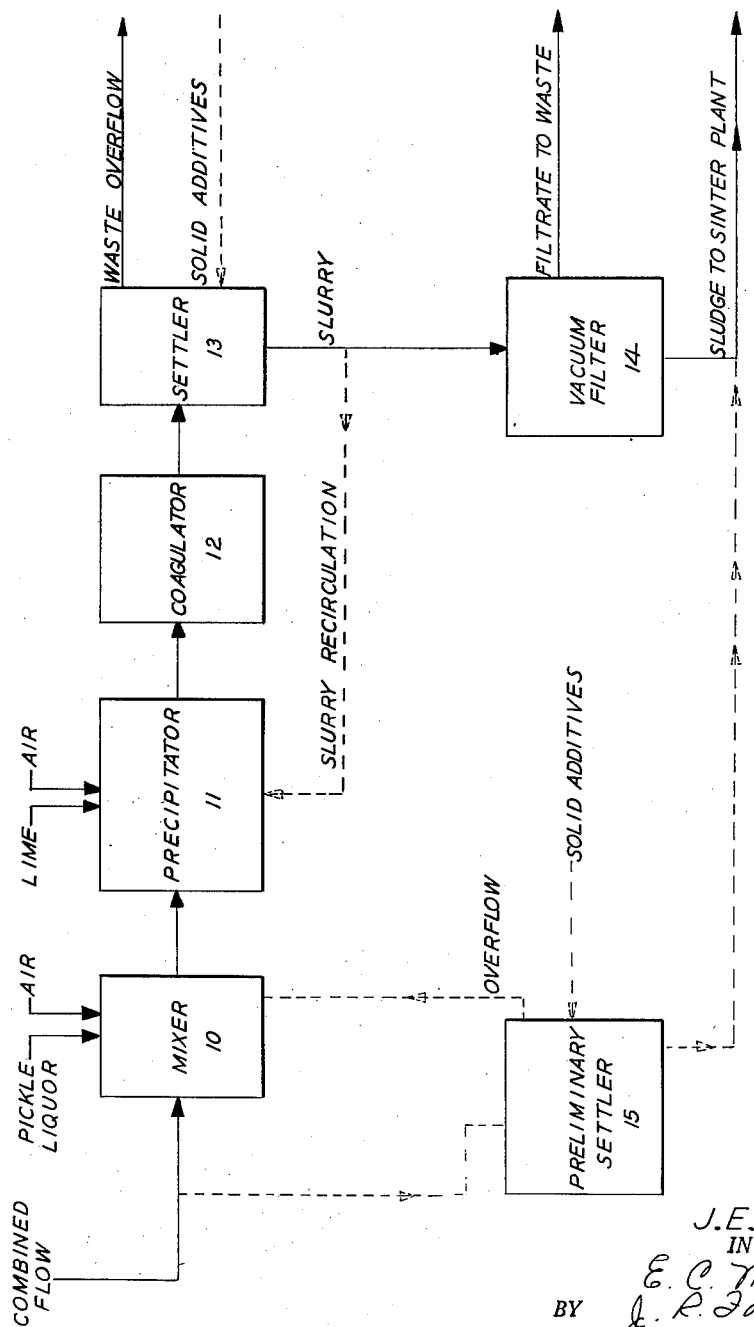

2,810,633

PROCESS OF RECOVERING IRON VALUES FROM BLAST FURNACE DUST

Jack Ellis Cooper, Wayne, Mich.

Application February 20, 1952, Serial No. 272,667

4 Claims. (Cl. 75—5)

This invention is concerned generally with the operation of integrated steel producing facilities, including blast furnaces and rolling mills, and more particularly with a process for economically disposing of waste material incidentally produced in the manufacture of pig iron and steel and at present expensive to recover or dispose of.

It has been the practice of steel producers in the past to dispose of waste products either to the atmosphere or to adjacent water courses. In recent years the necessity of finding more satisfactory methods of disposing of waste products has driven the steel industry to adopt rather expensive expedients. Two of the most troublesome wastes incidental to the operation of an integrated steel plant are the extremely fine dusts produced by the blast furnace and the pickle liquor produced by the sulphuric acid pickling of steel. The dust blown out of a blast furnace during operation has substantially the same chemical composition as the charge, and varies in size from sizable chunks down to particles of sub-micron size. By weight, by far the greater portion of the blast furnace dust is recovered in the initial dry dust catcher. However, to clean the blast furnace gas sufficiently to permit its efficient utilization as a furnace fuel, resort is had to three further cleaning apparatuses. Arranged in series, these are first, an ordinary wet gas scrubber, second, a so-called disintegrator, and third, an electrostatic Cottrell precipitator. In each of these pieces of apparatus, the dust is finally removed as a suspension in water. In a typical blast furnace installation producing 3,000 tons per day of pig iron, the water flow through these three final gas cleaners amounts to about 8,250 gallons per minute and is burdened with approximately 229 grains per gallon of solid matter. Over a 24-hour period these wash waters remove from the three final cleaners about 194 tons per day of dry solids.

In conventional blast furnace practice these wash waters are combined and processed through a settling chamber and the effluent from the settling chamber is discharged into the sewer or other adjacent water course. The average dry solids content of this effluent which is discharged into the sewer is about eight grains per gallon or, in the course of 24 hours, about 7 tons of dry solids are so lost. The iron value of these dry solids is not particularly serious economically even though its recovery would of course be desirable. The unfortunate feature of this process is that the material escaping in the effluent from the settling chamber represents the very finest dust produced in the blast furnace and hence the dust which is the most objectionable from a standpoint of disposal in natural water courses since these dusts are the most objectionable from a chromogenic standpoint. These dusts impart a persistent iron red color to the water course which is highly objectionable to the general public, despite the fact that quantitatively their effect upon the water course may be insignificant. The instant invention has been developed in an effort to solve this particular pollution problem.

This invention is probably best understood by reference to the drawing which is a schematic flow sheet of the process of the invention.

The combined flows of dust laden water from the blast furnace wet washer, disintegrator and Cottrell precipitator are emptied into mixer 10. While being intensively agitated in mixer 10, pickle liquor containing ferrous sulphate and sulphuric acid is slowly added. The agitating apparatus employed in mixer 10 is preferably one which is capable of inspirating air into the liquid being mixed. This type of agitator is well known to the art and any of several types may be employed. It is essential for this mixing operation that the pickle liquor be added slowly so that at no time does the concentration of calcium sulphate produced by the interaction of the calcium carbonate in the blast furnace dust and the free acid in the pickle liquor exceed the solubility of calcium sulphate in the existing liquid. In this mixer the natural alkalinity in the incoming water as well as the alkalinity available from the iron, lime and magnesium compounds from the blast furnace serve to at least partially neutralize the acidic constituents of the pickle liquor. It is to be understood that the free acid in the pickle liquor will be first neutralized with the resultant production of carbon dioxide. The air added to this mixer 10 serves the purpose of scrubbing the carbon dioxide from the mix as well as partially oxidizing any iron hydrates which may be precipitated at this stage. The removal of carbon dioxide, of course, permits the neutralization of more of the acidic constituents in the pickle liquor by the calcium carbonate and bicarbonate available in mixer 10.

It is difficult in mixer 10 to raise the pH of the liquid to a value between 7 and 8 which is necessary for the quantitative precipitation of the iron compounds. Accordingly, the liquor from mixer 10 is flowed to a precipitator 11 which may be structurally similar to mixer 10. Here calcium hydroxide, preferably in the form of slurry is slowly added. The agitation in precipitator 11 is accompanied by intensive aeration again to remove carbon dioxide from the slurry and to oxidize precipitated ferrous hydrate to ferric hydrate. Contrary to most literature teachings, the oxidation of ferrous to ferric iron in this very dilute solution proceeds quite well and yields a precipitate much more amenable to the subsequent steps of coagulating, settling and filtering. A typical time in mixer 10 and precipitator 11 would be two to five minutes each.

The effluent from precipitator 11 is quite free of soluble iron and is passed to coagulator 12. In this vessel the material is very gently agitated for a period of time of about twenty minutes. During the residence in the coagulator the precipitated iron hydrates and the iron oxides, lime compounds and coke carried over from the blast furnace co-act to produce a mass which will settle in a practicable length of time and which will produce a sludge which can be handled on a vacuum filter.

The effluent from coagulator 12 is conducted to any conventional quiescent settling apparatus of which the Dorr Thickener is a typical example. The size of the thickener is selected so that the residence of the material therein will be sufficiently protracted to produce an effluent having a solids content below the desired minimum. In most cases it is possible to produce an effluent from settler 13 having a solids content below ten parts per million. An effluent of this caliber may be added directly to streams with no adverse effects.

The under flow or slurry produced by settler 13 is conducted to vacuum filter 14. This vacuum filter may be any of the well known continuous rotary vacuum filters such as the Oliver or Emico, or resort may be had to continuous centrifuges for this separation. A particularly satisfactory filter for this separation is known as the string or FEinc filter. Any of these devices will produce a substantially clear filtrate and a sludge having a water content between fifty and eighty percent which is sufficiently dense to enable its transportation by conveyor to a sintering plant. Here it may be sintered along with the dry pulverulent solids recovered from the blast furnace gas by the dust catcher.

Modification of the above described flow sheet may be necessary to accommodate the conditions obtaining at individual plants. For example, a preliminary settler 15 may be interposed ahead of mixer 10 to give a preliminary separation of the more coarse solids and to relieve vacuum filter 14 of a portion of its load. The underflow from preliminary settler 15 may be added directly to the sludge from vacuum filter 14. Similarly a portion of the slurry obtained from settler 13 may be recirculated back to precipitator 11. This results in a further utilization of the alkalinity available in the slurry which would otherwise be wasted in the vacuum filter filtrate. This recirculation also provides solids for the nucleation of the ferrous and ferric hydrates. To either settler 13 or preliminary settler 15 may be added any carbonaceous or ferruginous materials which are either unobjectionable or desirable in the blast furnace after passage through the sintering plant. Typical examples of material which may be added at these points and hence disposed of to advantage, are coke breeze or fines, mill scale, fine iron ore, fine coal, or wood flour. These materials will aid in the settling or filtration or add valuable iron to the blast furnace or provide fuel for the sintering process.

This process has been described particularly with reference to treatment of whole pickle liquor. However, it is equally applicable to the disposal of copperas solutions which are comparatively acid-free. The necessity of disposing of copperas has hindered the utilization of many of the processes which have been suggested for the recovery of sulphuric acid from spent pickle liquors. These processes would be more feasible economically if the copperas produced could be considered as an asset if handled by the above described process and not as an industrial liability. In any event, it is necessary that the concentration of the reacting ingredients be kept sufficiently low and the agitation sufficiently intense that at no time is calcium sulphate precipitated. This is in accordance with well known chemical engineering techniques. In this way all of the sulphate ions originating in the pickle liquor are disposed of harmlessly as soluble sulphates and no sulphur is carried into the sintering plant or blast furnace.

I claim as my invention:

1. The process of treating an aqueous suspension of pulverulent solids recovered from the operation of a blast furnace comprising adding a mixture of ferrous sulphate and sulphuric acid to said suspension while said suspension is being vigorously agitated and aerated, said addition, agitation and aeration being conducted so that at no time does the concentration of calcium sulphate so produced exceed the solubility of calcium sulphate in the existing liquid, then adding to the mix so produced a slurry of calcium hydroxide while the mix is being vigorously agitated and aerated, coagulating the mix so produced by gentle agitation, separating the mix into a substantially clear effluent and a slurry, dewatering the slurry to the desired consistency to produce a highly ferruginous sludge and sintering the sludge to produce a material suitable for charging into a blast furnace.

2. The process of treating an aqueous suspension of pulverulent solids recovered from the operation of a blast furnace comprising adding a mixture of ferrous sulphate and sulphuric acid to said suspension while said suspension is being vigorously agitated and aerated, said addition, agitation and aeration being conducted so that at no time does the concentration of calcium sulphate so produced exceed the solubility of calcium sulphate in the existing liquid, then adding to the mix so produced a slurry of calcium hydroxide while the mix is being vigorously agitated and aerated, coagulating the mix so produced by gentle agitation, separating the mix into a substantially clear effluent and a slurry, recirculating a portion of this slurry to the portion of the process in which calcium hydroxide is added and dewatering the remainder of the slurry to produce a highly ferruginous sludge and sintering the sludge to produce a material suitable for charging into a blast furnace.

3. The process of treating an aqueous suspension of pulverulent solids recovered from the operation of a blast furnace comprising agitating and aerating this suspension and slowly adding a solution of ferrous sulphate and sulphuric acid, said addition, agitation and aeration being conducted so that at no time does the concentration of calcium sulphate so produced exceed the solubility of calcium sulphate in the existing liquid, transferring the suspension to a mixing and aerating chamber and there adding sufficient calcium hydroxide to precipitate all soluble iron salts, transferring the suspension to a coagulator and there gently agitating to flocculate the solids, settling the mix to produce a substantially clear effluent and a slurry, dewatering the slurry to produce a highly ferruginous sludge and sintering the sludge to provide a material suitable for charging into a blast furnace.

4. The process of treating an aqueous suspension of pulverulent solids recovered from the operation of a blast furnace comprising agitating and aerating this suspension and slowly adding ferrous sulphate, said addition, agitation and aeration being conducted so that at no time does the concentration of calcium sulphate so produced exceed the solubility of calcium sulphate in the existing liquid, transferring the suspension to a mixing and aerating chamber and there adding sufficient calcium hydroxide to precipitate all soluble iron salts, transferring the suspension to a coagulator and there gently agitating to flocculate the solids, settling the mix to produce a substantially clear effluent and a slurry, dewatering the slurry to produce a highly ferruginous sludge and sintering the sludge to provide a material suitable for charging into a blast furnace.

References Cited in the file of this patent

UNITED STATES PATENTS

| | | |
|---|---|---|
| 1,139,618 | Williams | May 18, 1915 |
| 1,188,705 | Vadner | June 27, 1916 |
| 1,793,342 | Travers | Feb. 17, 1931 |
| 1,847,179 | Genter | Mar. 1, 1932 |
| 1,879,373 | McComb | Sept. 27, 1932 |
| 1,956,420 | Gleason et al. | Apr. 24, 1934 |
| 2,277,663 | Francis et al. | Mar. 31, 1942 |
| 2,574,685 | Baxter et al. | Nov. 13, 1951 |